(12) United States Patent
Freling et al.

(10) Patent No.: US 7,879,459 B2
(45) Date of Patent: Feb. 1, 2011

(54) METALLIC ALLOY COMPOSITION AND PROTECTIVE COATING

(75) Inventors: Melvin Freling, West Hartford, CT (US); Kevin W. Schlichting, Storrs, CT (US)

(73) Assignee: United Technologies Corporation, Hartford, CT (US)

(*) Notice: Subject to any disclaimer, the term of this patent is extended or adjusted under 35 U.S.C. 154(b) by 513 days.

(21) Appl. No.: 11/768,978

(22) Filed: Jun. 27, 2007

(65) Prior Publication Data

US 2009/0004503 A1    Jan. 1, 2009

(51) Int. Cl.
B32B 15/04 (2006.01)
B05D 3/04 (2006.01)

(52) U.S. Cl. ........... 428/678; 428/632; 428/652; 428/667; 416/241 R; 420/588; 427/383.7; 427/455; 427/456

(58) Field of Classification Search ............ None
See application file for complete search history.

(56) References Cited

U.S. PATENT DOCUMENTS

| | | | |
|---|---|---|---|
| 3,542,530 A | 11/1970 | Talboom | |
| 3,819,338 A | 6/1974 | Bungardt | |
| 3,918,139 A | 11/1975 | Felten | |
| 3,928,026 A | 12/1975 | Hecht | |
| 3,951,642 A * | 4/1976 | Chang et al. | 75/255 |
| 3,976,436 A | 8/1976 | Chang | |
| 4,123,595 A | 10/1978 | Chang | |
| 4,346,137 A | 8/1982 | Hecht | |
| 4,477,538 A | 10/1984 | Clarke | |
| 4,585,481 A | 4/1986 | Gupta | |
| 4,615,865 A | 10/1986 | Duvall et al. | |
| 4,758,480 A | 7/1988 | Hecht | |
| 5,292,594 A | 3/1994 | Liburdi | |
| 5,419,976 A * | 5/1995 | Dulin | 428/570 |
| 5,817,372 A * | 10/1998 | Zheng | 427/456 |
| 6,007,645 A * | 12/1999 | Cetel et al. | 148/404 |
| 6,435,826 B1 | 8/2002 | Allen | |
| 6,435,835 B1 | 8/2002 | Allen | |
| 6,758,914 B2 | 7/2004 | Kool | |
| 7,264,888 B2 * | 9/2007 | Darolia et al. | 428/680 |
| 7,273,662 B2 * | 9/2007 | Gleeson et al. | 428/680 |
| 7,288,328 B2 * | 10/2007 | Darolia et al. | 428/680 |
| 2004/0115466 A1* | 6/2004 | Ogawa et al. | 428/633 |
| 2006/0093850 A1* | 5/2006 | Darolia et al. | 428/680 |
| 2007/0138019 A1 | 6/2007 | Kasule | |

FOREIGN PATENT DOCUMENTS

EP    1327702    7/2003

OTHER PUBLICATIONS

International Search Report and Written Opinion dated Dec. 16, 2008.

* cited by examiner

*Primary Examiner*—Aaron Austin
(74) *Attorney, Agent, or Firm*—Carlson, Gaskey & Olds PC

(57) ABSTRACT

A protective coating system includes a coating having a composition that includes about 5-40 wt % of chromium, of about 5-35 wt % of aluminum, about 0.1-9 wt % of at least one of silicon, hafnium, or magnesium, about 0.05-2 wt % of a Group IIIB Periodic Table element, a non-zero amount less than 13 wt % of at least one noble metal selected from platinum, palladium, and gold, and a balance including nickel, cobalt or iron.

19 Claims, 2 Drawing Sheets

METALLIC ALLOY COMPOSITION AND PROTECTIVE COATING

BACKGROUND OF THE INVENTION

This invention relates to protective coatings and, more particularly, to a protective coating having a metallic alloy composition that includes a noble metal for enhanced oxidation resistance.

Components that are exposed to high temperatures, such as gas turbine engine components typically include a protective coating system having one or more coating layers. For example, turbine blades, turbine vanes, and blade outer air seals typically include a coating system to protect from erosion, oxidation, corrosion or the like, to thereby enhance their ability or maintain efficient operation of the engine.

One type of typical coating system includes a metallic coating, such as a MCrAlY coating, as a "stand-alone" coating or as a bond coat for a ceramic topcoat. The metallic coating reacts with oxygen to form an adherent oxide that protects the underlying component from corrosion. Although effective, it also is desirable to control a rate of oxidation of the MCrAlY coating to provide enhanced corrosion protection. One proposed solution is to use additive elements to control oxidation. However, some types of additive elements may diffuse and react with elements from the component to form intermetallic phases that degrade the mechanical integrity of the component or reduce the oxidation resistance of the coating.

Accordingly, there is a need for a protective coating having a composition that provides effective oxidation resistance and that can be economically manufactured.

SUMMARY OF THE INVENTION

An example protective coating system includes a composition having about 5-40 wt % of chromium, about 5-35 wt % of aluminum, about 0.1-9 wt % of at least one of silicon, hafnium, or magnesium, about 0.05-2 wt % of a Group IIIB Periodic Table element, a non-zero amount less than 13 wt % of at least one noble metal selected from platinum, palladium, and gold, and a balance including at least one of nickel, cobalt, or iron.

In one example, the coating may be formed with the desired composition by diffusing a layer having the noble metal into another layer, or by using thermal spraying. For example, the thermal spraying may utilize a powder comprising an alloy composition that is nominally equivalent to the desired composition of the coating.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
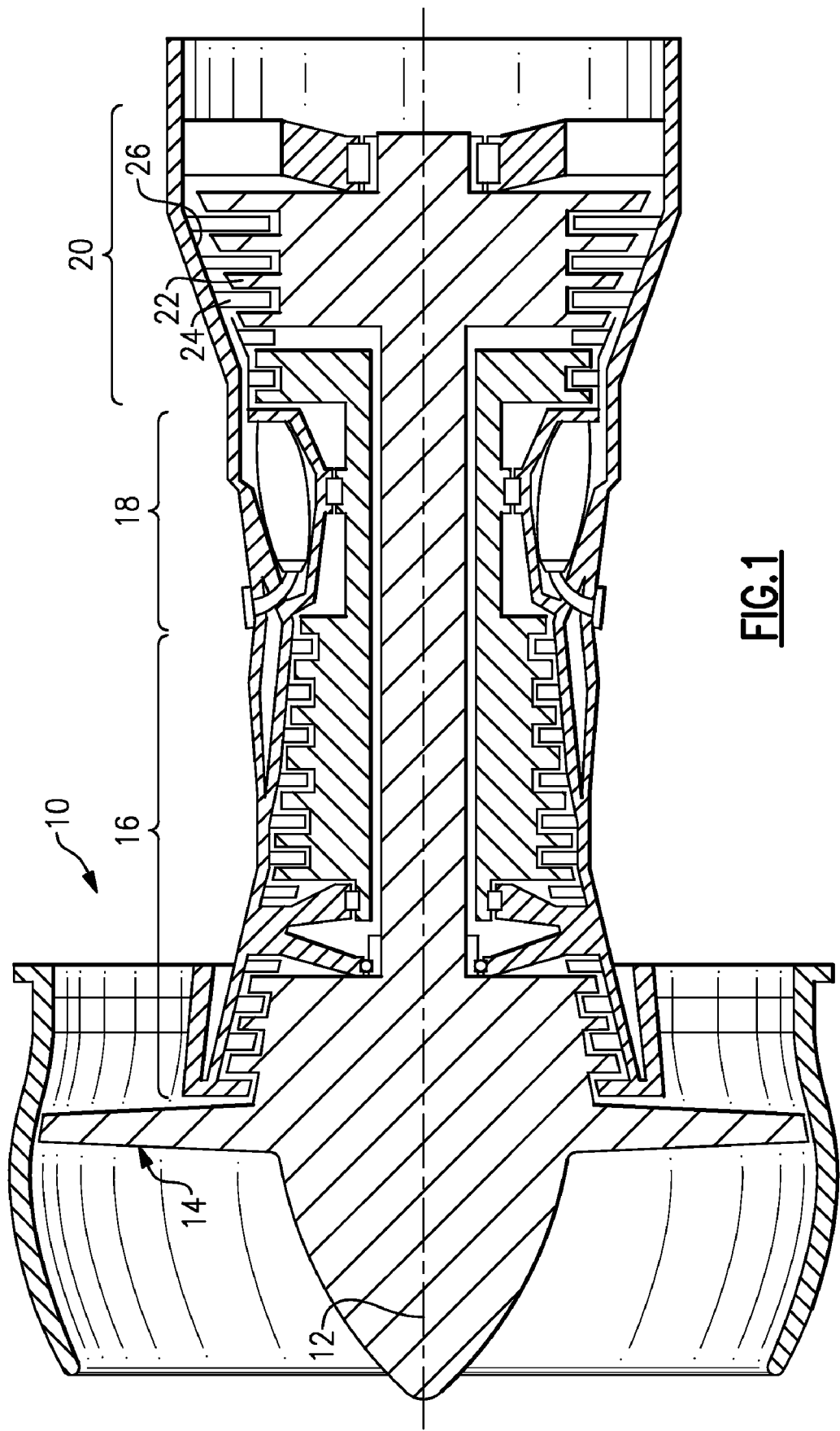
FIG. 1 illustrates an example gas turbine engine.

FIG. 1 illustrates selected portions of an example gas turbine engine 10, such as a gas turbine engine 10 used for propulsion. In this example, the turbine engine 10 is circumferentially disposed about an engine centerline 12. The turbine engine 10 includes a fan 14, a compressor section 16, a combustion section 18, and a turbine section 20 that includes turbine blades 22 and turbine vanes 24. Blade outer air seal segments 26 (shown schematically) are disposed circumferentially about the turbine section 20 to define a hot gas path between an outer structure of the gas turbine engine 10 and the turbine section 20. As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
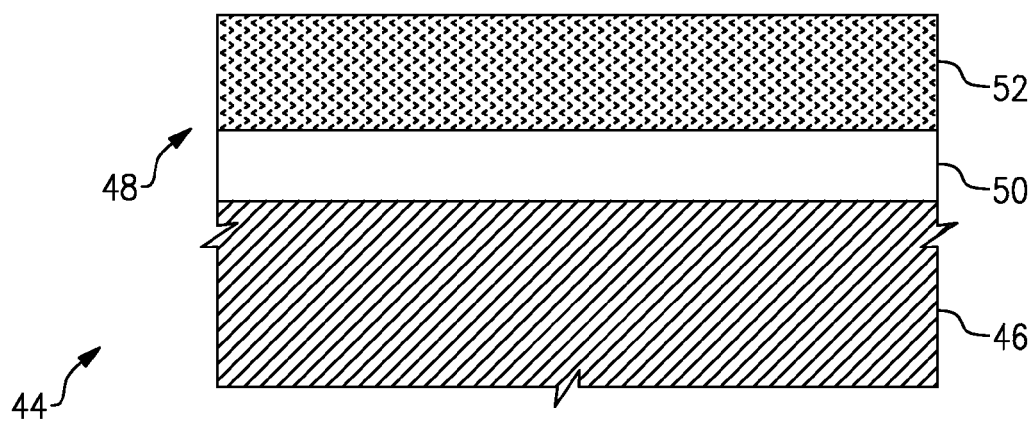
FIG. 2 illustrates an example portion of a component having a protective coating system that includes a protective layer.

FIG. 2 illustrates an example portion 44 of a component from the gas turbine engine 10, such as the turbine blade 22, the turbine vane 24, the blade outer air seal 26, or other component. Alternatively, the component may be a non-engine component for use in a different type of application. In this example, the component includes a substrate 46 having a protective coating system 48 disposed thereon. The protective coating system 48 includes a protective layer 50 disposed on the substrate 46 to protect the substrate 46 against oxidation, for example. Optionally, depending upon the type of component, one or more additional layers may be included in the protective coating system 48. For example, the component (e.g., the blade outer air seal 26) may include a ceramic topcoat 52 disposed on the protective layer 50 to provide a relatively abradable surface for contact with the rotating turbine blades 22. Additional metallic bond coat layers may also be used. Although a particular protective coating system 48 is shown, it is to be understood that the disclosed examples are not limited to the illustrated configuration and may include various additional layers. Additionally, it is to be understood that the protective layer 50 may be used as a "stand-alone" protective coating or as a bond coat for other layers.

The substrate 46 may include any type of material that is suitable for forming the desired component. For example, the substrate 46 is a nickel based alloy that is suitable for use in the gas turbine engine 10.

The protective layer 50 includes one or more noble metals in an amount that is suitable to provide control of an oxidation rate of the protective layer 50. For example, the composition of the protective layer 50 includes about 5-40 wt % of chromium, about 5-35 wt % of aluminum, about 0.1-9 wt % of at least one of silicon, hafnium, or magnesium, about 0.05-2 wt % of a Group IIIB Periodic Table element, a non-zero amount less than 13 wt % of at least one noble metal selected from platinum, palladium, and gold, and a balance including nickel, cobalt, or iron. The term "about" as used in this description relative to compositions refers to possible variation in the compositional percentages, such as normally accepted variations or tolerances in the art.

As can be appreciated, the disclosed composition of the protective layer 50 may be varied within the given ranges. In one example, the composition of the protective layer 50 includes about 5-40 wt % of chromium, about 8-35 wt % of aluminum, about 0.1-2 wt % of the Group IIIB Periodic Table element, about 0.1-7 wt % of silicon, about 0.1-2 wt % of hafnium, the non-zero amount less than 13 wt % of at least one noble metal selected from platinum, palladium, and gold, and a balance of nickel or cobalt. In a further example, the composition includes about 15-25 wt % of the chromium, about 10-20 wt % of the aluminum, and the Group IIIB Periodic Table element is yttrium.

In another example, the composition of the protective layer 50 includes about 8-30 wt % of chromium, about 5-20 wt % of aluminum, about 0.05-1 wt % of yttrium, about 0.1-5 wt % of at least one of silicon, hafnium, or magnesium, the non-zero amount less than 13 wt % of at least one noble metal selected from platinum, palladium, and gold, about 10-60 wt % of nickel, and about 8-30 wt % of cobalt.

In a further example, the disclosed example compositions include only the given elements, but may include impurities that do not materially affect the properties of the protective layer 50 or elements that are unmeasured or undetectable in the protective layer 50.

Figure 3:
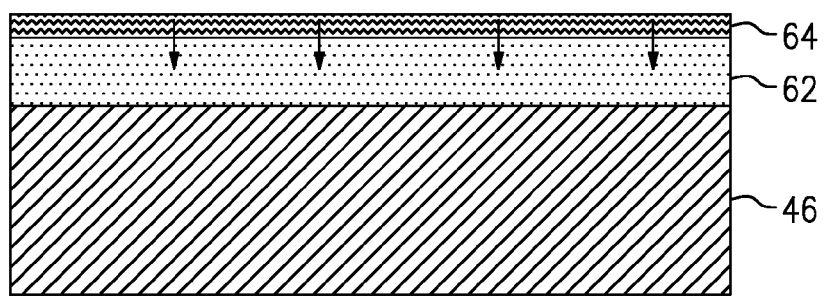
FIG. 3 illustrates an example process for forming a protective layer.

The protective layer 50 may be formed using any of a variety of different manufacturing methods. FIG. 3 illustrates one example method. In this example, an intermediate coating 62 is deposited onto the substrate 46. The intermediate layer 62 has a nominal composition that is equal to the desired composition of the protective layer 50 excluding the noble metal or metals. An additional layer 64 that includes the noble metal or metals is then deposited onto the intermediate layer 62 in a desired thickness. For example, the additional layer 64 is deposited using vapor deposition. The additional layer 64 is deposited with a predetermined thickness that provides an amount of the noble metal or metals to achieve the desired amount of the noble metal or metals in the composition of the protective layer 50 once the additional layer and the intermediate layer 62 diffuse together.

After deposition of the diffusion layer 64, the intermediate layer 62 and the diffusion layer 64 are heated at a suitable temperature to diffuse the diffusion layer 64 into the intermediate layer 62 to form a protective layer 50. The selected temperature may depend upon the type of noble metal and the composition of the intermediate layer 62. Given this description, one of ordinary skill in the art will recognize suitable diffusion temperatures based upon their selected compositions.

Figure 4:
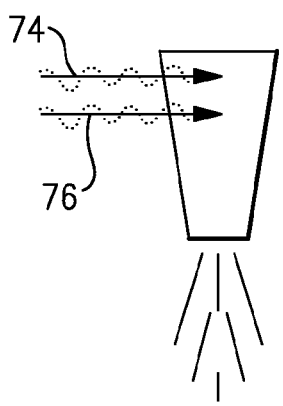
FIG. 4 illustrates another example process for forming a protective layer.
Figure 4:
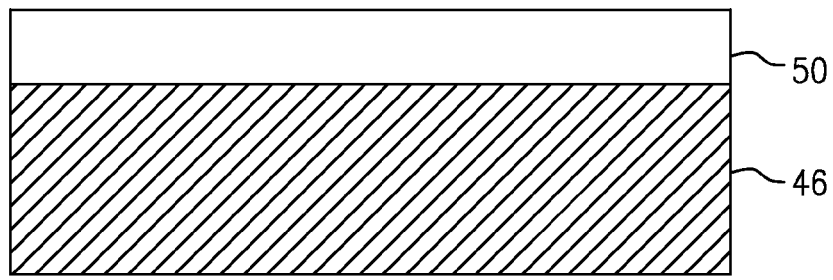

In another example shown in FIG. 4, the protective layer 50 is formed on the substrate 46 using a thermal spraying process. For example, the thermal spraying process may be any thermal spraying process that is suitable for forming the protective layer 50 with the desired composition.

In this example, the thermal spraying process is conducted in a protective atmosphere (e.g. vacuum, argon, etc.) and utilizes a powder 74 to form the protective layer 50. For example, the powder 74 includes particles having a composition that is nominally equal to the desired composition of the protective layer 50. The powder 74 is then sprayed, at a temperature that is suitable to at least partially melt the powder, onto the substrate 46 to form the protective layer 50. In a further example, the conditions for thermally spraying the powder 74 include feeding the powder 74 at a rate of 35-45 g/min in an argon carrier gas at a rate of 3-5 std L/min with a thermal spray gun power setting of 500-700 amps. A first feed gas of argon is provided at a rate of 25-32 std L/min and a second feed gas of hydrogen is provided at 7-11 std L/min. The substrate 46 is heated at a temperature of at least 1200° F., and a nominal distance between the nozzle of the thermal spray gun and the substrate 46 is about 12 inches.

Alternatively, the thermal spray process is a high velocity oxy-fuel ("HVOF") deposition process that uses nitrogen at 130+/−20 psig, oxygen at 165+/−20 psig, and hydrogen at 135+/−20 psig. The powder 74 is fed at a rate of 35 g/min in a nitrogen carrier gas of 150 psi with a spray distance of about 10 inches.

Alternatively, the powder 74 in either of the above processes may include particles having a composition that is nominally equal to the desired composition of the protective layer 50 excluding the noble metal or metals and is used in combination with a second powder 76 in a co-spray thermal process to form the protective layer 50. For example, the second powder 76 includes particles comprised of the noble metal or metals and is co-sprayed with the powder 74 to form the protective layer 50. The feed rates of the powder 74 and the second powder 76 is controlled such that the protective layer 50 includes a desired amount of the noble metal or metals. Given this description, one of ordinary skill in the art will recognize that deposition processes other than thermal spraying, such as plating, vapor deposition and the like, may alternatively be used.

Forming the protective layer 50 by thermal spraying provides the benefit of controlling the amount of the noble metal that is used. For example, in other methods such as vapor deposition, vaporized additive elements condense on the target substrate and also on the surrounding deposition equipment. Thus, not all of an initial amount of the additive elements is deposited onto the target substrate, which results in loss of the element or difficulty in reclaiming the element for reuse. For relatively inexpensive elements, the loss may be insignificant. However, certain materials, such as noble metals may be more expensive. Thermal spraying allows controlled deposition of the noble metal onto the substrate 46 by aiming the nozzle of the thermal spray gun at the substrate 46 to reduce deposition of the noble metal or metals onto areas other than the substrate 46. This provides enhanced control over the consumption and loss of the noble metal to thereby reduce the expense of the protective layer 50.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A protective coating system comprising:
   a protective layer having a composition including:
      about 5-40 wt % of chromium,
      about 5-35 wt % of aluminum,
      about 0.1-9 wt % of at least one of silicon, hafnium, or magnesium,
      about 0.05-2 wt % of a Group IIIB Periodic Table element,
      a nonzero amount less than 13 wt % of at least one noble metal comprising gold, and
      a balance including at least one of nickel, cobalt, or iron.

2. The protective coating system as recited in claim 1, wherein the protective layer is disposed on a metal alloy substrate.

3. The protective coating as recited in claim 2, wherein the protective layer is disposed between the metal alloy substrate and a ceramic topcoat.

4. The protective coating system as recited in claim 1, wherein the protective layer consists essentially of:
  about 5-40 wt % of the chromium;
  about 8-35 wt % of the aluminum;
  about 0.1-2 wt % of the Group IIIB Periodic Table Element, wherein the Group IIIB Periodic Table element consists of yttrium;
  about 0.1-7 wt % of the silicon;
  about 0.1-2 wt % of the hafnium;
  the nonzero amount less than 13 wt % of the at least one noble metal comprising gold; and
  the balance including at least one of nickel, cobalt, or iron.

5. The protective coating system as recited in claim 1, wherein the protective layer consists essentially of:
  about 8-30 wt % of the chromium;
  about 5-20 wt % of the aluminum;
  about 0.1-5 wt % of at least one of the silicon, the hafnium, or the magnesium;
  about 0.05-1 wt % of the Group IIIB Periodic Table Element, wherein the Group IIIB Periodic Table element consists of yttrium;
  the non-zero amount less than 13 wt % of the at least one noble metal comprising gold;
  about 10-60 wt % of the nickel; and
  about 8-30 wt % of the cobalt.

6. An alloy composition comprising:
  about 5-40 wt % of chromium;
  about 5-35 wt % of aluminum;
  about 0.1-9 wt % of at least one of silicon, hafnium, or magnesium;
  about 0.05-2 wt % of a Group IIIB Periodic Table element;
  a nonzero amount less than 13 wt % of at least one noble metal comprising gold; and
  a balance including at least one of nickel, cobalt, or iron.

7. The alloy composition as recited in claim 6, including about 0.1-7 wt % of the silicon and about 0.1-2 wt % of the hafnium.

8. The alloy composition as recited in claim 6, including about 0.1-5 wt % of the silicon, the hafnium, or the magnesium.

9. The alloy composition as recited in claim 6, including about 0.05-1 wt % of the Group IIIB Periodic Table Element, wherein the Group IIIB Periodic Table Element consists of yttrium.

10. The alloy composition as recited in claim 6, consisting essentially of:
  5-40 wt % of the chromium;
  8-35 wt % of the aluminum;
  0.1-7 wt % of the silicon;
  0.1-2 wt % of the hafnium;
  0.1-2 wt % of the Group IIIB Periodic Table element, wherein the Group IIIB Periodic Table element consists of yttrium;
  the nonzero amount less than 13 wt % of the at least one noble metal comprising gold; and
  the balance including nickel or cobalt.

11. The alloy composition as recited in claim 10, further consisting essentially of 15-25 wt % of the chromium, and 10-20 wt % of the aluminum.

12. The alloy composition as recited in claim 6, consisting essentially of:
  8-30 wt % of the chromium;
  5-20 wt % of the aluminum;
  0.1-5 wt % of the silicon, the hafnium, or the magnesium;
  0.05-1 wt % of the Group IIIB Periodic Table element, wherein the Group IIIB Periodic Table element consists of yttrium;
  the nonzero amount less than 13 wt % of the at least one noble metal comprising gold;
  about 10-60 wt % of the nickel; and
  about 8-30 wt % of the cobalt.

13. A method of manufacturing a protective coating system, comprising:
  forming a protective layer having a composition including about 5-40 wt % of chromium, about 5-35 wt % of aluminum, about 0.1-9 wt % of at least one of silicon, hafnium, or magnesium, about 0.05-2 wt % of a Group IIIB Periodic Table element, a nonzero amount less than 13 wt % of at least one noble metal selected from platinum, palladium, and gold, and a balance including at least one of nickel, cobalt, or iron, by thermal spraying a first powder having a nominally equivalent composition to the composition of the protective layer but excluding the at least one noble metal and a second powder comprising the at least one noble metal, including forming an intermediate layer having the composition excluding the at least one noble metal, depositing a diffusion layer on the intermediate layer, where the diffusion layer comprises the at least one noble metal, and heating the intermediate layer and the diffusion layer to diffuse the at least one noble metal into the intermediate layer to form the protective layer.

14. The method as recited in claim 13, including thermally spraying using an oxy-fuel.

15. The method as recited in claim 13, including heating a substrate at a temperature of at least 1200° F.

16. The method as recited in claim 13, including thermal spraying under a protective environment.

17. The method as recited in claim 13, including thermally spraying at a rate of 35-45 g/min in an argon carrier gas at a rate of 3-5 std L/min with a thermal spray gun power setting of 500-700 amps.

18. The method as recited in claim 13, wherein the at least one noble metal is gold.

19. A method of manufacturing a protective coating system, comprising:
  forming a protective layer having a composition including about 5-40 wt % of chromium, about 5-35 wt % of aluminum, about 0.1-9 wt % of at least one of silicon, hafnium, or magnesium, about 0.05-2 wt % of a Group IIIB Periodic Table element, a nonzero amount less than 13 wt % of at least one noble metal selected from platinum, palladium, and gold, and a balance including at least one of nickel, cobalt, or iron, by thermal spraying a first powder having a nominally equivalent composition to the composition of the protective layer but excluding the at least one noble metal and a second powder comprising the at least one noble metal, or by thermal spraying a powder having particles with having a nominally equivalent composition to the composition of the protective layer, including thermally spraying in nitrogen at 130+/−20 psig, oxygen at 165+/−20 psig, and hydrogen at 135+/−20 psig.

* * * * *